United States Patent [19]
Tatsumi et al.

[11] 3,974,206
[45] Aug. 10, 1976

[54] PROCESS FOR THE THERMAL DECOMPOSITION OF THERMOPLASTIC RESINS WITH A HEAT TRANSFER MEDIUM

[75] Inventors: Takeichi Tatsumi, Tokyo; Katsuyoshi Ogawa, Omiya; Yutaka Tanaka, Fujisawa; Kazuo Ueno; Shoji Daikoku, both of Hiratsuka, all of Japan

[73] Assignee: Mitsubishi Gas Chemical Company, Inc., Japan

[22] Filed: July 9, 1974

[21] Appl. No.: 482,797

[52] U.S. Cl............................ 260/486 R; 260/2.3; 260/669 R
[51] Int. Cl.² ........................................ C07C 69/54
[58] Field of Search ........................ 260/486, 669 R

[56] References Cited
UNITED STATES PATENTS
2,470,361   5/1949   Miller.............................. 260/486 R

*Primary Examiner*—Paul J. Killos
*Attorney, Agent, or Firm*—Wenderoth, Lind & Ponack

[57] ABSTRACT

A polymerizable monomer is obtained by contacting a waste of thermoplastic resin with a fluid heat transfer medium, cooling the resulting decomposed product and subjecting it to distillation. Synthetic resin such as acrylic acid polystyrenic resins are thus thermally decomposed by contact with a heat transfer medium thereby decomposing it composed of an organic heat transfer medium and an inorganic heat transfer medium having a melting point of less than 500°C.

11 Claims, 1 Drawing Figure

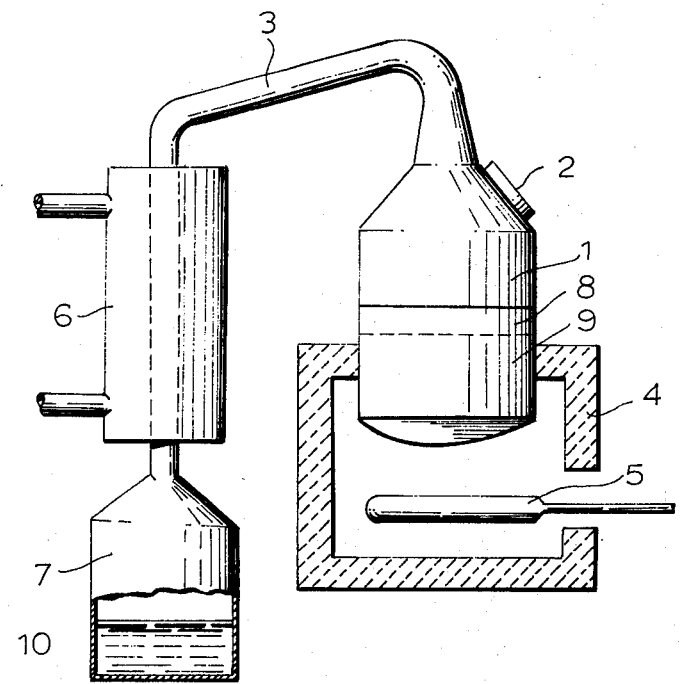

PROCESS FOR THE THERMAL DECOMPOSITION OF THERMOPLASTIC RESINS WITH A HEAT TRANSFER MEDIUM

The present invention relates to a process and apparatus for the thermal decomposition of thermoplastic resins with a heat transfer medium.

More particularly, the present invention relates to a process for the production of a decomposition product of thermoplastic resins which comprises subjecting said thermoplastic resins i.e. waste acrylic synthetic resin or polystyrenic synthetic resin to the action of a heat transfer medium composed of an inorganic heat transfer medium and an organic heat transfer medium the melting points of which are all below 500°C. This results in depolymerization or decomposition of the resins and the resulting products are condensed.

Moreover, the present invention relates to a process for the recovery of a monomer from the waste of thermoplastic resin which is characterized in that the waste of thermoplastic resin, especially aforesaid waste acrylic synthetic resin or styrenic synthetic resin is contacted with polyolefinic resin or waxy substance which has been previously heated and melted, at a temperature at or above the decomposition temperature of said waste produce said monomer.

BACKGROUND OF THE INVENTION

Heretofore, when waste acrylic or polystyrenic resin was thermally decomposed to obtain a decomposition product, the process was performed in a heating vessel capable of being externally heated. However not only there was an unavoidable defect with such process in that thermal conduction from the heating vessel is surprisingly insufficient because of vacant spaces which are formed between the heating vessel and the raw material resins due to irregular shapes of the raw material resin but also there was the further unavoidable defect that the thermal conduction is further hindered due to accumulation and solidification of carbon and other solid decomposition residues and substances having high boiling points on the bottom of the heating vessel which are difficultly removed. Accordingly, instead of the aforesaid process, a process in which as a heat transfer medium, a substance which may be changed to a molten state at thermal decomposition temperature i.e. metal, polyolefinic resin or the like is introduced together with the raw material resin into the heating vessel to thereby heat the raw material resin to decompose, has been employed.

When an inorganic material such as a metal i.e. zinc, tin and lead or an alloy i.e. solder and Wood's alloy is used as the heat transfer medium, there is an advantage in that cracked gas is not contaminated with the heating medium because of low vapor pressure of the inorganic heat transfer medium in general. On the contrary, there is a disadvantage with the inorganic heat transfer medium in that the raw material resin floats on the surface thereof because the specific gravity of said medium is greater than that of the raw material resin. Further, while no decomposition residue is sedimented so that there is no chance for the decomposition residue to be solidified on the bottom of the heating vessel, nevertheless there are defects in that at room temperature, not only the decomposition residue is solidified with the inorganic heat transfer medium which is difficultly removed, but also there is a danger of the decomposition residue damaging the heating vessel due to formation of an alloy between the decomposition residue and the heating vessel.

When an organic material such as a polyolefinic resin is used as the heat transfer medium, the specific gravity of the organic heat transfer medium is, in general, less than that of acrylic resin so that the raw material acrylic resin is sedimented in the organic heat transfer medium and is efficiently decomposed with sufficient thermal conduction. In this case there is also an advantage in that the decomposition residue may be easily removed together with the organic heat transfer medium because of dispersion of the decomposition residue in the heat transfer medium. However there is a defect in that the cracked gas of the raw material resin is contaminated with a substance having a low boiling point which is produced as the result of degradation of a part of the organic heat transfer medium, even at a temperature below that at which degradation of the raw material resin commences.

For a relatively long time, it has been known that a monomer is recovered in high yield by thermal decomposition of acrylic resin or styrenic resin. And as the process of recovering a monomer from methacrylic acid ester which has been conventionally employed, there is a dry distillation process wherein methacrylic acid ester polymer is introduced into decomposition vessel which is to be directly heated at 300°c.

However with this process there are defects in that a monomer is recovered in a colored state, a decomposition residue is accumulated on the inside walls of the heating vessel to cause reduction of the thermal efficiency of the heating vessel and a long time is required for removal of this decomposition residue.

The present inventors have completed the present invention as the results of their studies on the advantages and defects when the above inorganic and organic heat transfer medium are individually employed.

DETAILED DESCRIPTION OF THE INVENTION

The present invention relates to a process for treating the plastic wastes, characterized in that said plastic waste of acrylic acid resin, polystyrenic resin or the like is subject to decomposition with a heat transfer medium of which an inorganic heat transfer medium and an organic heat transfer medium are used together and to a process for efficiently recovering the decomposition products.

The present invention further relates to a process for recovering a monomer from thermoplastic synthetic resin characterized in that a polyolefinic resin, waxy substance or the like, which is in molten state and is maintained at a temperature of decomposing the thermoplastic synthetic resin or at a temperature higher than that, is used as a fluid heat transfer medium. Further, splinters of the waste of thermoplastic synthetic resin, particularly acrylic synthetic resin, styrenic synthetic resin or the like (hereafter referred to as waste plastic) are subject to thermal decomposition with said heat transfer medium in molten state to obtain cracked gas which is then cooled and condensed, and the resultant product is then subjected to distillation.

The mixing ratio of the inorganic heat transfer medium and the organic heat transfer medium in the present invention is properly variable according the kind of the raw material resin to be treated but it is desirable to mix the organic heat transfer medium and the inorganic heat transfer medium in quantities as much as to make it easy to form protective coatings preventing the surface of the inorganic heat transfer medium in heated fluid state from being oxidized to a decomposition residue and to remove it.

The mixing ratio of the organic heat transfer medium and the inorganic heat transfer medium is preferably in the range of about 1 : 10 to about 5 : 5 by volume.

As the inorganic heat transfer medium namely metals, alloys and metallic compounds having melting points below to 500°c are used.

That is to say, a member or a mixture of two or more members selected from simple metals such as zinc, tin, bismuth, antimony, lead and the like, alloys such as Wood's alloy, Rose's alloy, soft solder and the like, chlorides such as sodium chloride, lithium chloride and the like and metallic compounds such as sodium nitrate, lithium nitrate and the like is used. And as the organic heat transfer medium olefinic resin, tar pitch or the like is used.

The thermal decomposition temperature is properly variable according to the kind of the raw material resin to be treated, the kind of the heat transfer medium and the like but it is preferably less than 500°c.

The reason why polyolefinic resin or waxy substance is used as the fluid heat transfer medium in the present invention is that the waste plastic may be efficiently thermally decomposed wherein splinters of the waste plastic to be treated are directly contacted with the heat transfer medium in molten state with their surroundings and also the thermally decomposing process may be continuously performed by continuously introducing the material to be treated into the system. In comparison with the case when a metal in molten state is used as a fluid heat transfer medium, the fluid heat transfer medium according to the present invention is superior as the thermally decomposing material for the waste plastic because the splinters of the waste plastic do not float on the surface of fluid heat transfer medium because the specific gravity of the heat transfer medium is less than that of the metallic fluid heat transfer medium. In the case when the fluid heat transfer medium is reduced in quality during the thermal decomposition operation due to degradation or vaporization, it may be easily supplemented according to need. And when polyolefinic resin is used as the fluid heat transfer medium, a polyolefin oil may be recovered by thermal decomposition of the polyolefinic resin and said polyolefin oil which is convenient because of ease of its combustion.

As the waste plastic in the present invention there are employed waste withdrawn from the process of producing thermoplastic synthetic resin, a waste of thermoplastic synthetic resin product, other waste plastics and the like. As the thermoplastic synthetic resin, acrylic resin and styrenic resin are particularly preferred; as the acrylic resin there are polymethylacrylate, polyethylacrylate, polypropylacrylate, polybutylacrylate, as the styrenic resin there are polystyrene, polymethylstyrene, polyethylstyrene, polybutylstyrene, polydimethylstyrene and the like.

Also as the copolymers thereof there are methacrylic acid methylstyrene copolymer, methacrylic acid methyl-dimethyl styrene copolymer and the like.

The substances which are used as the fluid heat transfer medium need not always be in fluid state at room temperature and they are, for instance, polyolefinic resins or waxy substances which may be molten in fluid state at the time of thermal decomposition operation.

As the polyolefinic resin, polyethylene (low density polyethylene, middle density polyethylene and high density polyethylene are included), polypropylene (crystalline and/or uncrystalline polypropylene are included) and a mixture thereof, or copolymers such as ethylene-propylene copolymer, ethylene-vinylacetate copolymer, ethylene-acrylic acid methyl copolymer, ethylene-acrylic acid ethyl copolymer, polybutene, polyisobutylene and the like are included; as the waxy substance, paraffin wax, microcrystalline wax and the like and further, waxes having the same effect as these are respectively included as the fluid heat transfer medium.

The temperature at the aforesaid materials become molten to be used as the fluid heat transfer medium is in the range at which the waste plastic may be thermally decomposed or above and preferably 200°c to 500°c.

The embodiment in practice of the present invention will be hereunder explained.

An installation which includes distillation equipment and equipment for thermally decomposing waste plastic comprising exhaust equipment is provided. This apparatus permits charging the raw material waste plastic and cooling and condensing apparatus. A heater, and apparatus for the thermal decomposition, with which apparatus the charging the heat transfer medium, exhaust equipment for the fluid heat transfer medium, exhaust equipment of the decomposition residue, agitator and thermometer are provided. These may be employed to carry out the process according to the present invention.

The apparatus for the thermal decomposition which is used in the present invention is, for example, constituted by a heating vessel in which the waste plastic is thermally decomposed and a furnace for heating the vessel.

On the heating vessel, an inlet port for introducing the raw material plastic and the heat transfer medium and a exhaust pipe for exhausting cracked gas are installed. With the exhaust pipe, a condenser for cooling the cracked gas is provided. The fraction which has been cooled is passed to storage tank. The above inlet port is not only used for introducing the medium but also used for withdrawing the decomposition residue (included in the organic heat transfer medium), however it is possible to separately provide the inlet port for introducing the heat transfer medium and the exhaust port for the heat transfer medium containing the decomposition residue at appropriate places on the heating vessel. Also if necessary, an agitator may be installed thereon. The furnace is an apparatus for heating the heating vessel on which a gaseous or electric heat source equipment is placed.

The process according to the present invention will be hereunder explained with following the FIGURE attached.

FIGURE shows an example of thermal decomposition installation which may be employed in the present invention. Wherein 1 depicts heating vessel; 2 depicts an opening having a cover through which the raw material resin and the heat transfer medium are charged; 3 depicts an exhaust pipe for exhausting cracked gas with which a cooling condenser is provided; 4 depicts a furnace with which a heat source 5 such as a gas burner is provided. 7 depicts a storage tank in which the fraction of the decomposed raw material resin is stored and wherein cracked gas which has been cooled and condensed in cooling and condensing apparatus through which exhaust pipe 3 is stored.

In the FIGURE, heating vessel 1, exhaust pipe 3 and storage tank 7 are connected but they may be separately and variably installed.

Through opening (inlet port) 2 having a cover, by the use of belt conveyor (not indicated in the FIGURE), there are introduced a heat transfer medium consisting of a mixture of an inorganic heat transfer medium (lead) and an organic heat transfer medium (polyethylene) the ratio of which has been previously adjusted so as to be 7 : 3 (by volume). Gas burner 5 is then ignited to heat the heating vessel. The heating vessel is heated to thermal decomposition temperature and is maintained at 400°c. During the operation polyethylene is first melted, lead is successively melted and a polyethylene layer 8 is formed on the upper surface of fluid lead 9. The heating vessel is filled with a part of the fluid polyethylene wherein an equilibrium is maintained. At this point, splinters with a size of about 5 cm$^3$ of the waste acrylic acid resin are continuously introduced through inlet port 2 by a belt conveyor. The acrylic acid resin introduced is first dropped on said polyethylene layer, is immediately sedimentated thereon, and the sediment reaches the surface of fluid lead to be thermally decomposed therein. The resulting gaseous decomposition product is introduced into cooling and condensing equipment 6 through exhaust pipe 3 where the decomposition product is cooled to a liquid state which is stored in storage tank 7 as a cracked oil 10. After the thermal decomposition treatment is continuously run for 5 hours, a high purity fraction of distillate is obtained in high yield.

In the present invention, a part of the organic heat transfer medium is vaporized so that it becomes gradually reduced in quantity.

Accordingly it is necessary to properly supplement the organic heat transfer medium. In this case, the organic heat transfer medium may be supplemented solely or together with the raw material resin.

The raw material resin is heated on the inorganic heat transfer medium or in the organic heat transfer medium so that it is efficiently thermally decomposed. The decomposition residue i.e. carbon, other solids and substances with a high boiling point have specific gravities lower than that of the inorganic heat transfer medium so that the decomposition residue is included in the organic heat transfer medium.

Accordingly, in the case of removing the decomposition residue, cleaning is easily performed by taking the organic heat transfer medium out of the system. During the removal operation of the decomposition residue, the thermally decomposition process is eventually stopped the inorganic heat transfer medium is never oxidized or deliquesced because the upper surface of the inorganic heat transfer medium is covered by the residual organic heat transfer medium.

A monomer is separated in a way such that splinters of polyolefinic resin are charged in the thermally decomposing vessel through inlet port into the heat transfer medium, wherein the polyolefinic resin is heated and molten, while the temperature is maintained at or above the thermal decomposition point of the raw material waste plastic. Thus, into the fluid heat transfer medium, a waste plastic of acrylic or styrenic resin is continuously introduced through inlet port and it is thermally decomposed. The resulting cracked gas is liquefied on cooling by condensing equipment and the liquid is then distilled.

Polymerizable monomers obtained according to the present invention are methyl acrylate, ethyl acrylate, propyl acrylate, butyl acrylate, methyl methacrylate, ethyl methacrylate, butyl methacrylate, styrene, methyl styrene. dimethyl styrene, ethylstyrene and the like.

The yield of acrylic monomer from acrylic resin is of about 70 to 85%, styrenic monomer from styrenic resin is about 35 to 55% and others are low molecular olefins.

The present invention is further explained by the following illustrative examples.

EXAMPLE 1

In stainless vessel equipped with an agitator, inlet port for the raw material, exhaust port for cracked gas distillate and thermometer, 3kg of atactic polypropylene having a softening point of 125°c is heated to 350°c to 370°c. 1kg of splintered waste polymethylacrylic acid is then introduced for 20 minutes. The resulting gas is liquefied in a condenser and the liquefied product is recovered thereby to obtain 1.15kg of a product.

The produced is engaged in fractionation to obtain 0.81kg of methyl methacrylate having the following characteristic values.

|  | Unit | The process according to the present invention | Known process |
| --- | --- | --- | --- |
| Specific Gravity | $D_4^{20}$ | 0.94 | 0.945 |
| Monomer | % | 98.5 | 94.5 |
| Color number |  | 5 | 15 |
| Moisture | % | 0.12 | 0.32 |
| Free acid | % | 0.001 | 0.24 |
| First fraction of distillate | °C | 96 | 96 |
| Volume of the floun | % | 96.5 | 96 |

EXAMPLE 2

In the same vessel as used in Example 1 3kg of high pressure polyethylene is charged followed by heat to 400°c. Into this, particles of cellular styrene are introduced in the amount of 3kg per an hour. Thermal decomposition of the cellular styrene is continuously carried out for 3 hours to obtain 8.1kg of a decomposition product. 500g of the product is rectified to obtain 230g of styrene monomer.

EXAMPLE 3

In the same vessel as used in Example 1, 3kg of a mixture of atactic polypropylene and high pressure polyethylene is charged followed by heat to 380°c. 3kg of splintered waste of polymethacrylic acid methyl is introduced continuously for 60 minutes to obtain 3.27kg of a decomposed product. The product is fractionated to obtain 2.27kg of methyl methacrylate having a color number of less than 5.

EXAMPLE 4

In the same vessel as used in Example 1 3kg of microcrystalline wax having a softening point of 85°c is heated to 350°c to 360°c to be melted into which 1kg of splintered polymethylacrylate is introduced continuously for 30 minutes to obtain 1.3kg of a decomposed product. 500g of the product is rectified to obtain 292g of methyl acrylate.

EXAMPLE 5

In stainless heating vessel provided with heater, agitator and thermometer 3kg of tar pitch is charged as the heat transfer medium followed by heat to 400°c to render it molten. While the tar pitch is kept at that temperature, 1kg of splintered acrylic acid resin is introduced thereinto continuously for 20 minutes to be thermally decomposed. The resulting cracked gas is passed to cooling and condensing equipment through the exhaust pipe wherein it is liquefied. Thereafter the liquid is distilled.

What is claimed is:

1. A process for the production of decomposition products of thermoplastic resins which comprises:
   1. contacting said resin with a fluid heat transfer medium, said medium comprising
      a. an organic heat transfer medium having a melting point higher than the decomposition temperature of said thermoplastic resin but less than 500°C and
      b. an inorganic heat transfer medium having a melting point of less than 500°C and a greater density than said organic heat transfer medium,
   said organic heat transfer medium fully covering said inorganic heat transfer medium,
   the contact between said thermoplastic resin and said fluid heat transfer medium being at a temperature sufficient to effect the decomposition of said thermoplastic resin and
   2. recovering said decomposition products.

2. A method according to claim 1, wherein the thermoplastic is introduced onto the surface of the organic heat transfer medium from which said thermoplastic sediments onto the surface of the inorganic heat transfer medium and is thermally decomposed thereon to form gaseous decomposition products.

3. A method according to claim 2 wherein the ratio of organic to inorganic heat transfer medium is about 1:10 to about 5:5 by volume.

4. A process according to claim 1 wherein the thermoplastic resin is the waste withdrawn from the process of producing thermoplastic synthetic resin or the waste the thermoplastic resin product.

5. A process according to claim 1 wherein the thermoplastic resin is the waste acrylic synthetic resin or of polystyrenic synthetic resin.

6. A process according claim 1 wherein the inorganic heat transfer medium is a member or a mixture of two or more members selected from the group consisting of zinc, tin, bismuth, antimony and lead and the organic heat transfer medium is olefinic resin or tar pitch.

7. A process according to claim 1 wherein the inorganic heat transfer medium is a member or a mixture of two or more members selected from the group consisting of Wood's alloy, Rose's alloy and soft solder and the organic heat transfer medium is olefinic resin or tar pitch.

8. A process according to claim 1 wherein the inorganic heat transfer medium is a member or a mixture of two or more members selected from the group consisting of sodium chloride, lithium chloride, sodium nitrate and lithium nitrate and the organic heat transfer medium is olefinic resin or tar pitch.

9. A process for the production of a monomer from thermoplastic resin, characterized in that polyolefinic resin or waxy substance which is in molten state and maintained at a temperature of decomposing the thermoplastic synthetic resin or at a temperature higher than that is used as a fluid heat transfer medium, splinters of the waste of thermoplastic synthetic resin are thermally decomposed with said heat transfer medium to obtain cracked gas, the cracked gas is cooled and condensed and the resulting product is destillated.

10. A process according to claim 9 wherein the polyolefinic resin is polyethylene (low density polyethylene, middle density polyethylene and high density polyethylene are included), polypropylene or a mixture thereof, ethylene-propylene copolymer, ethylene-vinylacetate copolymer, ethylene-acrylic acid methyl copolymer, ethylene-acrylic acid ethyl copolymer polybutene or polyisobutylene.

11. A process according to claim 9 wherein the waxy substance is paraffin wax or microcrystal wax.

* * * * *